July 28, 1964 H. G. ALLEN 3,142,204
METHOD OF MAKING BY-PASS DIE
Filed May 23, 1961 2 Sheets-Sheet 1
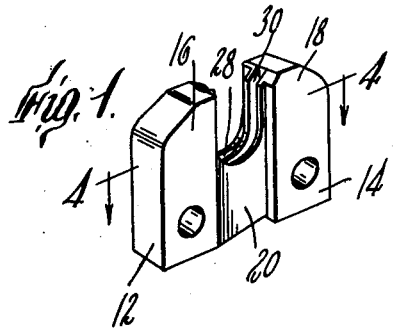
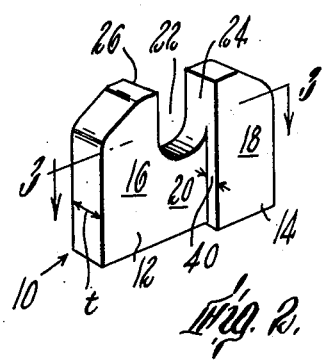
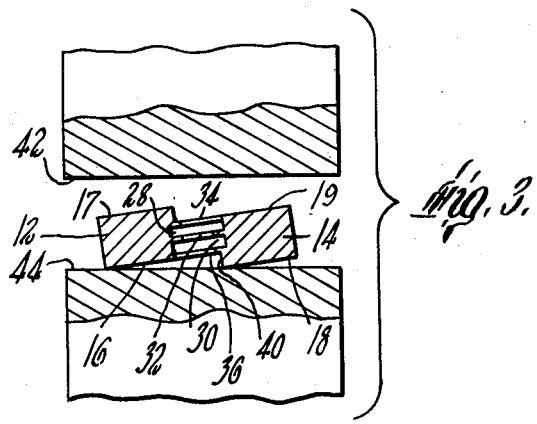
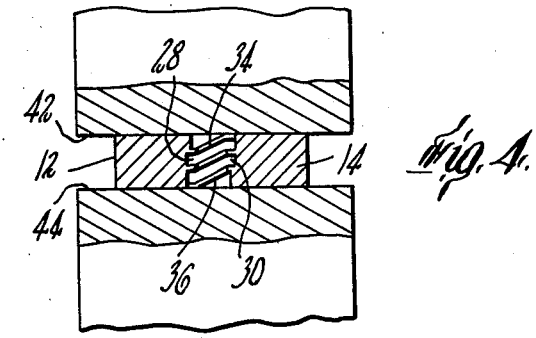

July 28, 1964

H. G. ALLEN 3,142,204

METHOD OF MAKING BY-PASS DIE

Filed May 23, 1961

United States Patent Office 3,142,204
Patented July 28, 1964

3,142,204
METHOD OF MAKING BY-PASS DIE
Howard G. Allen, Cranston, R.I., assignor to Bostitch, Inc., East Greenwich, R.I., a corporation of Rhode Island
Filed May 23, 1961, Ser. No. 127,070
6 Claims. (Cl. 76—101)

This invention relates to a method of manufacturing a staple-clinching die or anvil of the by-pass type in which the legs of the staple are caused to pass beside each other during the clinching operation. Dies of this type are well known in the art, as shown, for example in Maynard 1,963,306 issued June 19, 1934. The method of the present invention is also useful in the manufacture of two-part by-pass dies in which the two parts are arranged to be moved into and out of mating relationship during operation of the staple-clinching machine.

In the operation of staple-clinching or wire-stitching machines in which a die of the by-pass type is employed, a reciprocating driver engages the top or bridge portion of a staple and urges the staple, legs foremost, into the grooves or channels and between the lands of the die and around the article to be fastened or secured, and by a continuation of the same movement forces the legs of the staple into a curved portion of the die where they are bent or curved toward each other and simultaneously twisted laterally so that their ends pass by and lie parallel to each other. Because of the complex shape of the lands and grooves in the die required to effect this result, the machining of such dies has been a difficult and expensive operation, requiring the use of several different cutters on a milling machine followed by a considerable amount of hand finishing. Even so, the lands and grooves have in most cases not had as smooth and highly polished a surface finish as is desired for the best and most effective operation of the machine.

One object of the present invention is to provide a new and improved method of manufacture of such clinching dies.

Another object is to provide a method of manufacture of such clinching dies which makes it possible to employ a single cutter in a standard milling machine procedure and avoids the necessity for extensive hand finishing.

Still another object is to provide an improved method of manufacture which results in a finished die having lands and grooves of superior surface finish.

Other and further objects will be apparent from the drawing and from the description which follows.

In the drawing:

FIG. 1 is an isometric view of a finished clinching die made by the method of the present invention;

FIG. 2 is an isometric view of a die blank from which the finished die is constructed;

FIG. 3 is a view in cross section taken along line 3—3 of FIG. 2 after the step of milling the grooves and lands into the blank showing the blank in position to be bent or skewed between the flat platens of a press;

FIG. 4 is a view corresponding to FIG. 3 after completion of the bending or skewing operation, the die being shown in section taken along line 4—4 of FIG. 1;

Figure 5:
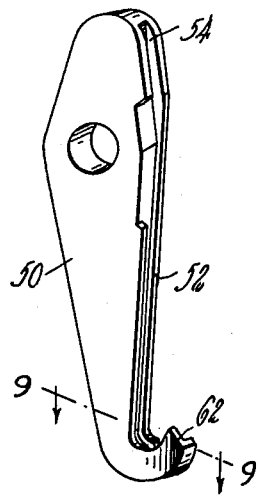
FIG. 5 is an isometric view of a finished part of a two-part die.

In carrying out the method of the present invention as applied to a one-part die, there is provided a blank 10 of suitable material such as soft steel, as shown in FIG. 2 of the drawing. This blank consists of a pair of posts 12, 14 of equal thickness, indicated by the symbol $t$. Each post is provided with a pair of flat lateral faces 16, 17 and 18, 19 the posts being joined together by a web 20 which is of less thickness than the posts. One of the lateral faces of the web 20 is flush with the lateral face 16 of post 12, while the opposite face of web 20 is flush with face 19 of post 14 so that posts 12, 14 are laterally off-set with respect to each other.

The blank is provided with a generally U-shaped slot 22 having its opposing side portions forming parallel walls 24, 26 adjacent to or approximately coinciding with the junctions between web 20 and posts 12, 14, a concavely curved face in the intermediate portion 20.

A pair of straight channels or grooves 28, 30 (FIG. 3) is then formed in the opposing walls 24, 26 of slot 22 by any of the usual milling procedures. Each channel 28, 30 is straight until it reaches the curved or concaved intermediate portion at the bottom of the U-shaped slot where a curved extension or end-portion of the channel extends into and around the curved end of the slot, and each channel is laterally off-set with respect to the other with the curved end-portions parallel to each other. A land 32 is interposed between and separates the curved extensions of the two channels 28, 30 and extends continuously throughout the length of both channels. Lands 34, 36 at the outer side of each channel vanish near the end of the curved extension of each channel in the preferred embodiment shown in the drawing, so that each channel may be said to be generally J-shaped and lying in a separate plane from the other channel with the curved portions of both channels parallel and adjacent to each other and with the longer legs of the channels extending parallel to each other from opposite sides of their curved portions. The center line of each channel 28, 30 including its curved extension lies in a single plane which is separate from the plane of the other channel and parallel thereto, the lateral spacing or off-set between the planes in the preferred embodiment being equal to the lateral off-set 40 (FIG. 2) of posts 12, 14.

Following the milling operation described above, the blank, as shown in FIG. 3, is placed between a pair of flat-faced platens 42, 44 of a hydraulic press which is then actuated as shown in FIG. 4 to skew web 20 to displace the straight portions of the channels laterally to bring their center lines into a single plane and remove the lateral off-set of posts 12, 14 with respect to each other. Most of the bending of web 20 occurs along and adjacent to lines which are extensions of the opposing walls of slot 22, the blank being bent in one direction along one line and in the opposite direction along the other line.

In order to ensure long wear of the die, it is preferably hardened, for example case hardened, following the bending or skewing operation. Any conventional procedure may be employed for the hardening step.

In use of the die in a staple-clinching machine, it is arranged so that one leg of each staple enters the straight portion of channel 28 while the other leg enters the straight portion of channel 30. These legs are then guided and twisted as they are forced into the curved extensions of these channels so that they are curved or bent toward each other and pass beside each other to lie in parallel overlapping relation in the usual manner.

Figure 6:
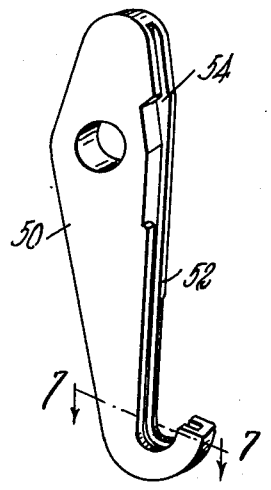
FIG. 6 is an isometric view of a die blank for one part of a two-part die after a staple guide channel has been milled into it.
Figure 7:
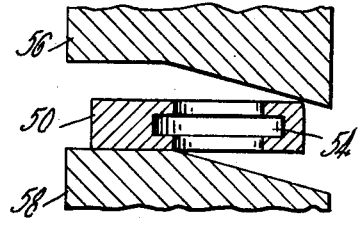
FIG. 7 is a view in section showing the die blank after milling in position to be bent or skewed, the section of the blank being taken along line 7—7 of FIG. 6.
Figure 8:
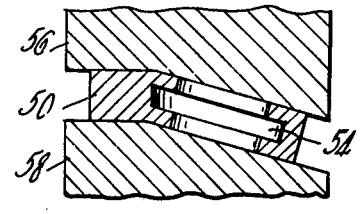
FIG. 8 is a view corresponding to FIG. 7 after completion of the bending or skewing operation.

The method of the present invention may also be applied to a two-part die as shown in FIGS. 5 to 11 of the drawings. A pair of blanks 50 is provided, each of which is generally J-shaped as shown in FIG. 6, having a portion of its face 52 concavely curved at its lower end. Into this face a staple guiding channel 54 is milled by any conventional procedure. Each blank is then placed between a pair of platens 56, 58 of a hydraulic press which is then actuated as shown in FIG. 8 to bend or skew that part of blank 50 which contains the curved end portion of channel 54.

The center line of channel 54 in the blank in its original form as shown in FIGS. 6 and 7 lies in a single plane, and the bending or skewing is in a direction to displace this center line in the bottom part of the blank from its original plane. This lateral bending of the part of the blank containing the curved end portion of channel 54 is in an amount such that when a pair of the blanks is mated as shown in FIGS. 9 to 11, the main portions of the staple guiding channels 54, 54 are opposite each other just as in the case of the unitary die illustrated in FIGS. 1 to 4 inclusive.

Figure 9:
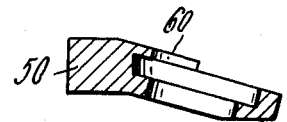
FIG. 9 is a view in section showing the bent die part in finished form after a further milling step, the die part being shown in section along 9—9 of FIG. 5.

After bending of the die blanks, they are further milled to remove a portion of land 60 on the mating sides of the dies and to remove corners 62 to minimize the space required for operation of the dies, as best appears in FIG. 9. When two completed die parts are mated, as shown in FIGS. 10 to 12, there is no overlap of lands 60, the two parts supplementing each other to form a pair of parallel guide channels, as best appears in FIG. 12.

As in the case of the one-piece die, the parts are preferably made of steel and are hardened following the bending or skewing operation by means of any conventional hardening procedure.

Figure 10:
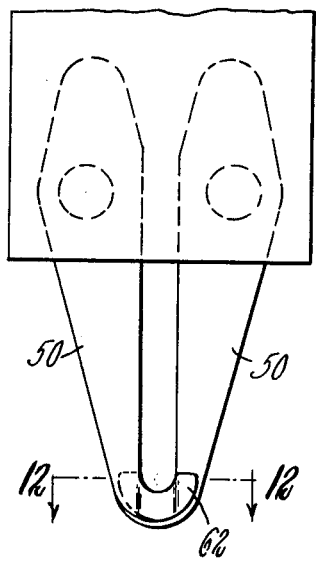
FIG. 10 is a view in front elevation showing a two-part die made in accordance with the invention mounted in mating relation on a clinching machine.
Figure 11:
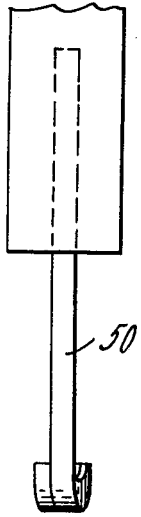
FIG. 11 is a view in side elevation of the die parts of FIG. 10.
Figure 12:
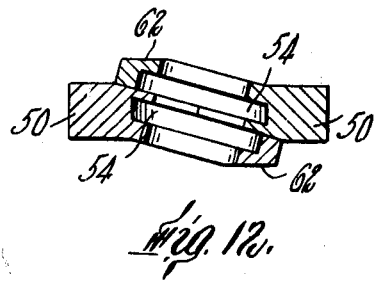
FIG. 12 is a view in section taken along line 12—12 of FIG. 10.

The two-part die functions to clinch a staple in the same manner as the one-piece die, the two parts being pivotally mounted in a staple driving machine as shown in FIGS. 10 and 11 so that they can be separated to permit introduction and removal of the article to be clinched between the two parts of the die.

This application is a continuation in part of my copending application Serial No. 33,206, filed June 1, 1960, now abandoned.

Although specific embodiments of the invention have been described herein, it is not intended to limit the invention solely thereto, but to include all of the obvious variations and modifications within the spirit and scope of the appended claims.

What is claimed is:

1. The method of making a by-pass die for use in clinching staples which comprises forming a portion of a die-blank with its face concavely curved and forming at least one staple-guiding channel extending along said face with its end lying in said curved portion, the center line of said channel lying in a single plane, bending the part of said blank containing said curved portion in a direction laterally of said plane to displace the center line in said portion from said plane, and then hardening said blank.

2. The method of making a by-pass die for use in clinching staples which comprises forming a generally U-shaped slot in a unitary blank of metal forming a first channel extending along one of the opposing walls of said slot into the curved portion thereof, forming a second channel extending along the other wall of said slot into the curved portion thereof beside the first said channel, the channels being laterally off-set with respect to each other, then bending said blank in one direction along a line which is an extension of one of said opposing walls and in the opposite direction along a line which is an extension of the other of said opposing walls to remove said lateral off-set.

3. The method of making a two-part by-pass die for use in clinching staples which comprises forming a staple-guiding channel with a curved end portion in each of a pair of die blanks, bending that part of each blank containing said curved end portion to displace the part laterally by an amount sufficient to bring said staple-guiding channels opposite each other when said pair of blanks is mated, and then hardening said blanks.

4. The method of making a by-pass die for use in a staple-clinching machine which comprises milling into one of the opposing walls of a generally U-shaped slot in a metal blank a straight channel having a curved extension which reaches into the rounded end portion of said slot, the center line of said channel and extension lying in a single plane, milling a second straight channel into the opposing wall of said slot, said second channel having a curved extension reaching into the rounded end portion of said slot, the center line of said second channel lying in a second plane spaced from and parallel to the first said plane, bending said blank adjacent the rounded end portion of said slot to displace the straight portions of said channels laterally to bring their center lines into a single plane, and then hardening said blank.

5. The method of making a by-pass die for use in clinching staples which comprises forming a die-blank having a recess with side portions and a concave bottom portion, each said side portions having at least one staple-guiding channel, said channels extending into said concave portion, the center line of one of said channels lying in a plane separate from and parallel to the other of said channels, and then bending that part of said die blank containing said concave portion to bring said channels in the side portions opposite each other.

6. The method as claimed in claim 5 in which the blank is of soft steel and which comprises the step of subsequently subjecting the die blank to a hardening operation.

References Cited in the file of this patent
UNITED STATES PATENTS

| | | |
|---|---|---|
| 1,683,272 | Tucker | Sept. 4, 1928 |
| 1,922,793 | Coyle | Aug. 15, 1933 |
| 2,855,667 | Meyer | Oct. 14, 1955 |